June 11, 1968   G. C. COKER ETAL   3,387,406
DUAL-HINGED TAILGATE
Filed Aug. 24, 1966   3 Sheets-Sheet 1
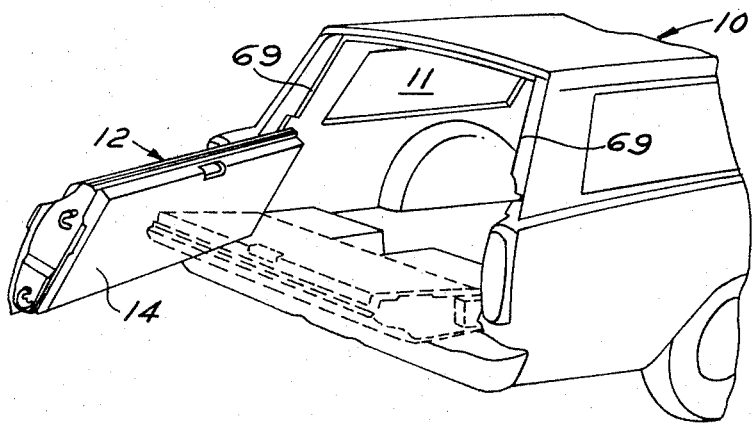
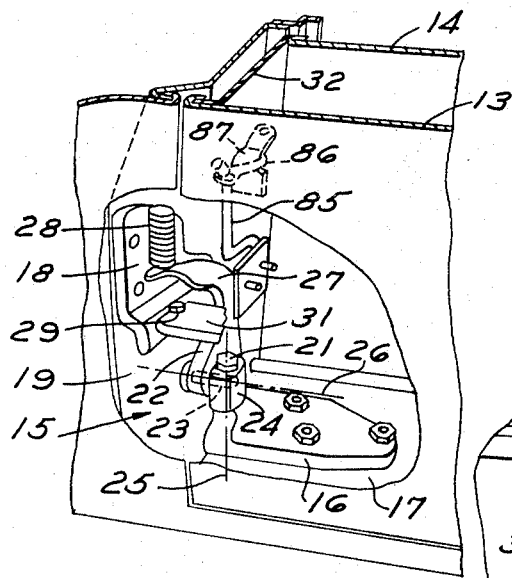
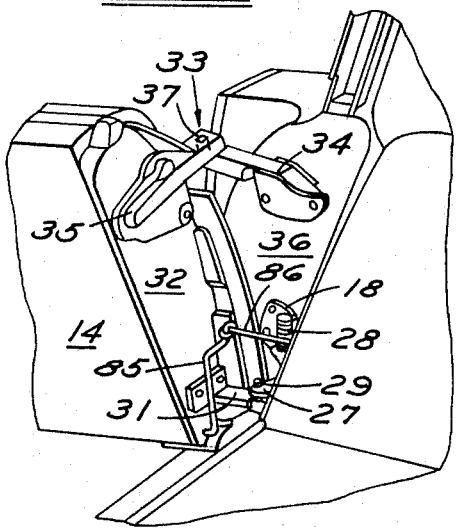
INVENTORS
GERALD C. COKER
BOLESLAW W. BODEK
BY
John R. Faulkner
John J. Roethel
ATTORNEYS

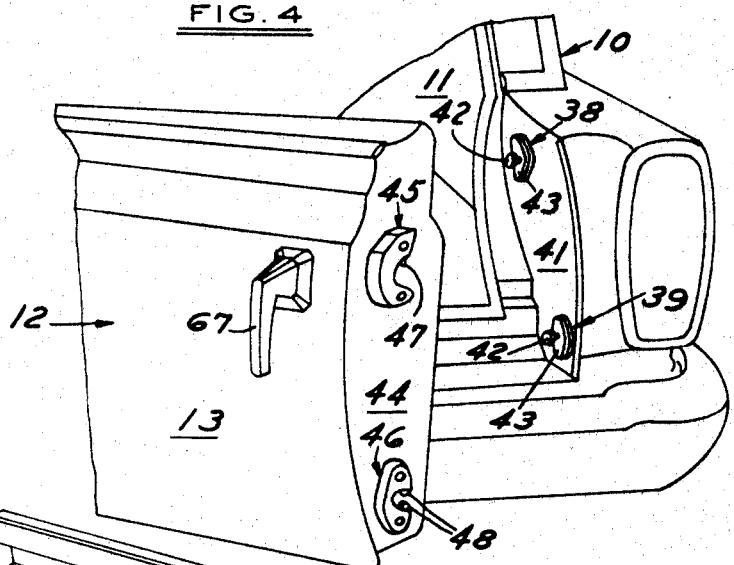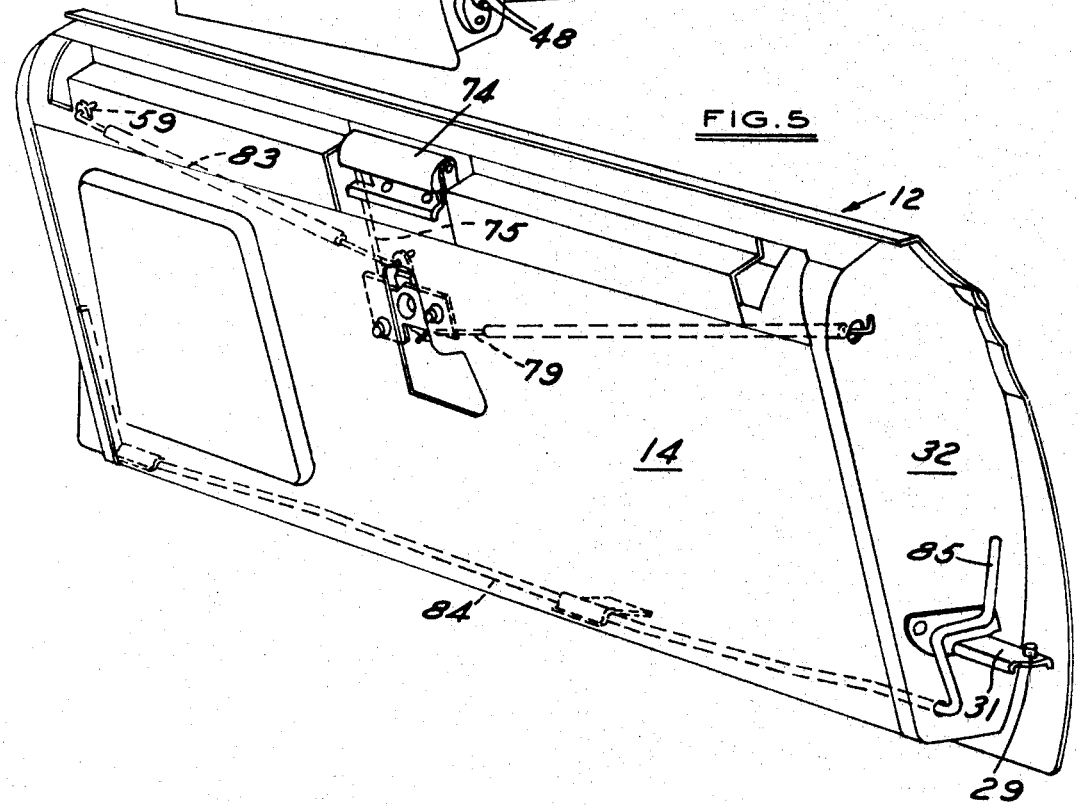

June 11, 1968 G. C. COKER ET AL 3,387,406

DUAL-HINGED TAILGATE

Filed Aug. 24, 1966 3 Sheets-Sheet 3

INVENTORS
GERALD C. COKER
BOLESLAW W. BODEK
BY
John R. Faulkner
John J. Roethel
ATTORNEYS

United States Patent Office 3,387,406
Patented June 11, 1968

3,387,406
DUAL-HINGED TAILGATE
Gerald C. Coker, Livonia, and Boleslaw W. Bodek, Inkster, Mich., assignors to Ford Motor Company, Dearborn, Mich., a corporation of Delaware
Filed Aug. 24, 1966, Ser. No. 574,793
10 Claims. (Cl. 49—192)

This invention relates to vehicle body closures and particularly to tailgates for combined passenger and cargo carrying vehicles popularly known as "station wagons."

Tailgates through which access to the rearwardly facing third seats or to the cargo carrying area of station wagons is obtained are conventionally hinged at their lower edge for swinging movement about a horizontal hinge axis. This conventional hinging arrangement has certain inherent disadvantages. When egress or ingress to the third seat area is desired, the horizontally extending tailgate presents an obstacle in the form of a high step affecting the ease of entry or exit from the third seat area. When the vehicle has been converted from a passenger carrying to a cargo carrying function, the horizontal tailgate projects rearwardly to such an extent as to make it difficult to place or reach any packages or other cargo on the cargo carrying floor to the immediate rear of the fixed seats of the vehicle body.

It is an object of the present invention to provide a dual action closure for a vehicle body opening, particularly a dual action door-tailgate for the rear opening in a station wagon body. The dual action door-tailgate may be operated either as a door swingable about a substantially vertical hinge axis or as a tailgate swingable about a substantially horizontal hinge axis. The dual action door-tailgate provides the advantages of both a rear door and a tailgate. When used as a door, the closure provides a vertical door-like opening giving unobstructed access to the rearwardly facing third seats or to the cargo carrying area. When used as a tailgate, and if left in the open position, the dual action door-tailgate provides an extension of the cargo carrying area for articles which may be longer than the cargo carrying length of the station wagon with the door in its closed position.

The object of the present invention is accomplished by mounting the dual action door-tailgate within the rear access opening frame structure on four attaching points. One of the attaching points comprises a multi-hinge mechanism located at a lower corner of the door and providing both vertical and horizontal hinge pintles about which the tailgate selectively may be swung. The attachment point located at the corner of the door-tailgate vertically above the multi-hinge mechanism is a combined hinge and latch mechanism. This combined hinge and latch mechanism, when functioning as a hinge, has a hinge pintle which is in alignment with the vertical hinge pintle of the multi-hinge member at the lower attachment point, the two vertical pintles defining a vertical hinge axis about which the door-tailgate is swingable.

On the opposite side of the door-tailgate adjacent the lower corner is a second combined hinge and latch mechanism which, when it functions as a hinge mechanism, has a hinge pintle in alignment with the horizontal hinge pintle of the multi-hinge mechanism, the two horizontal pintles defining a horizontal hinge axis about which the door tailgate may be swung. The fourth attachment point, the one located above the last mentioned combined hinge and latch mechanism, is solely a latch mechanism.

Two operating handles are provided, one being located on the outside panel of the door-tailgate and the other on the inside panel. The operating handles are connected by suitable linkages to the combination hinge-latch mechanisms and to the latch mechanism.

When it is desired to operate the door-tailgate as a door swingable abut the vertical hinge axis, the outside handle is actuated. This causes release of the latch mechanism at the fourth attachment point and release of the latch mechanism portion of the combination hinge-latch mechanism having the horizontal hinge pintle as a component. The door-tailgate is then swingable outwardly as a door about the vertical hinge axis defined by the vertical hinge pintle of the multi-hinge mechanism and by the vertical pintle of the combination hinge-latch mechanism located thereabove.

If it is desired to operate the door-tailgate so that it is swingable about the horizontal axis only, i.e., as a tailgate, the inside handle is operated which causes release of the latch mechanisms at the upper attachment points whereby the door-tailgate is swingable about the horizontal hinge axis defined by the horizontal pintle of the multi-hinge mechanism and the horizontal pintle of the combined hinge-latch mechanism located at the opposite lower corner of the tailgate.

The construction and arrangement includes mechanical interlock devices to limit the door-tailgate either to swinging movement about the vertical hinge axis or about the horizontal hinge axis. Further, provision is made to prevent release of the latch mechanisms when the tailgate window is in an up position. The tailgate window must be retracted into the tailgate before the latch mechanisms can be actuated.

These and other objects, advantages and features of the invention will become more fully apparent as reference is had to the following specification and drawings wherein:

FIG. 1 is a rear perspective view of a portion of a station wagon body illustrating the door-tailgate in its opened positions, the position of the door-tailgate when swung to an opened position about its upstanding hinge axis being shown in solid outline and the position of the door-tailgate when swung about its horizontal hinge axis being shown in dotted outline;

FIG. 2 illustrates a multi-hinge mechanism connecting the door-tailgate at one lower end corner to the vehicle body;

FIG. 3 is an illustration of an upper hinge-latch mechanism and its relationship to the lower multi-hinge mechanism of FIG. 2;

FIG. 4 is an illustration of the attachment means at the free end of the door-tailgate utilized to hold the door-tailgate in latched position;

FIG. 5 is a perspective view illustrating other components of the door-tailgate assembly providing for the dual hinging action and in particular illustrating the torsion bar for counterbalancing the weight of the door-tailgate when used as a tailgate;

Figure 6:
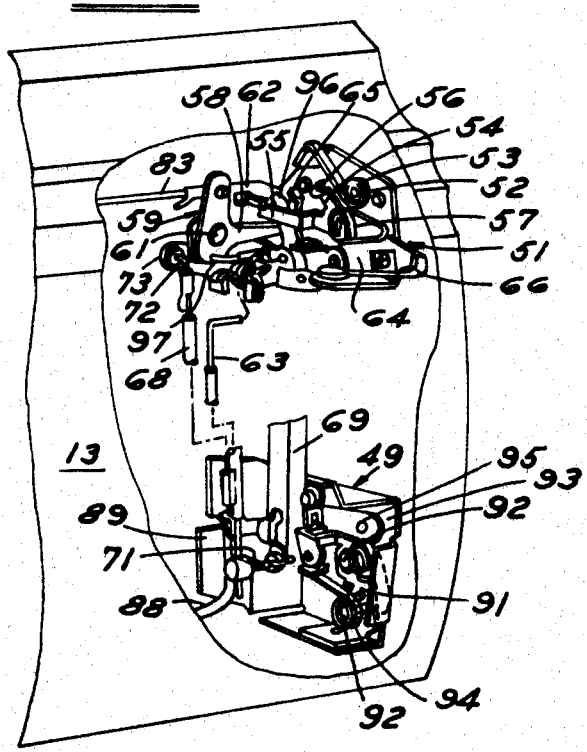
FIG. 6 is a view taken at the same end of the door-tailgate as shown in FIG. 4 but revealing the latch mechanisms located interiorly thereof.

Referring now to the drawings, and particularly to FIG. 1, there is illustrated the rear body portion 10 of a combination passenger and cargo carrying vehicle popularly known as a "station wagon." At its rear end, the rear body portion 10 is provided with a large access opening 11.

In a conventional station wagon, the lower half of the access opening 11 is closed by a door or tailgate hinged at its lower horizontal edge for swinging movement from a substantially upright closed position to a substantially horizontal open position. This tailgate usually comprises spaced outer and inner panels housing the operating mechanism for the latch devices adapted in closed position to secure the tailgate to the vehicle body. The space between the panels also provides a well into which a rear window used to close the upper half of the access opening may be retracted and also provides housing for the mechanism for raising and lowering this rear window.

The tailgate, generally designated 12, embodying the present invention comprises an outer panel 13 and an inner panel 14 providing the door structure or shell adapted to house latch mechanisms, a window regulator mechanism and rear window supporting and guiding means. The tailgate 12 of the present invention, however, differs from a conventional tailgate. It is supported in the access opening on a combination of hinge devices and latch mechanisms which permit it to be swung from a substantially upright closed position to a substantially horizontal opened position in the conventional manner; or alternatively to be swung from a substantially upright closed position to a substantially opened position as are the other doors of the vehicle body. Thus, the dual action design of the tailgate 12, hereinafter referred to as a door-tailgate, allows the tailgate to be lowered in a normal manner to a horizontal drop gate position as an extension to the floor cargo area. The dual action design also allows the tailgate to be opened sideways as a door to provide direct access to the floor cargo area.

Referring now to FIG. 2, there is shown a multi-hinge assembly, generally designated 15, which is located at the lower left rear corner of the vehicle body access opening 11. The location of this multi-hinge assembly at the lower left rear corner, as viewed by a person facing the vehicle from the rear end, permits the door-tailgate to be swung away from the normal curb-side of the vehicle. A person loading the vehicle from the curb would then not have to walk around the door to do so.

The multi-hinge mechanism 15 comprises a mounting plate 16 secured to the underside of door-tailgate frame member 17 and a mounting plate 18 secured to the vertical face of body frame member 19 defining the left side of access opening 11.

The mounting plate 16 has at its outer end, the end projecting beyond the adjacent end of the tailgate frame member 17, an upstanding pintle 21. The mounting plate 18 has an depending arm 22 journalled to receive a horizontal pintle 23 carried on a support block 24. The support block 24 is journalled for rotation about the pintle 21. Thus, as indicated by the vertical line 25 the multi-hinge mechanism 15 provides a vertical pivot axis and also as indicated by the line 26 a horizontal pivot axis.

The mounting plate 18 is utilized to support a door check mechanism comprising a swinging door check arm 27 which is spring loaded by coil spring 28 to resist displacement in a substantially horizontal plane. The door check arm is adapted to coact with a door check pin 29 carried on a bracket 31 secured to the end face 32 of the door tailgate 12. This occurs only when the door-tailgate is swung about the vertical pivot axis as a door and the relative position of engagement of the free end of the door check arm with the door check pin 29 is as shown in FIG. 3.

Located above the multi-hinge mechanism 15 is a hinge-latch mechanism generally designated 33. This upper hinge-latch 33 mechanism is designed in two separable parts and performs two functions. It functions as a hinge when the tailgate is operated as a door and as a latch mechanism when the tailgate is in a fully closed position. For purposes of description, this combination hinge-latch mechanism may be considered as comprising a "hinge on body" part 34 and a "hinge on gate" part 35. The "hinge on gate" part 35 contains a spring loaded latch (not visible) which secures the two parts of the hinge together when the tailgate is operated as a door or is in fully closed position, and releases the two parts when the tailgate is operated as a drop gate.

The "hinge on body" part 34, which is attached to the body pillar 36, contains a vertical pivot pin 37 with a rectangular extension on top of the pin. The part 35 of the upper hinge-latch mechanism which is attached to the door-tailgate 12 is slotted on the underside to accept the rectangular extension of the pivot pin. When the door-tailgate is operated as a door, it pivots on the upper hinge pin or pintle 37 and the vertical pivot pin or pintle 21 of the multi-hinge mechanism 15.

Figure 7:
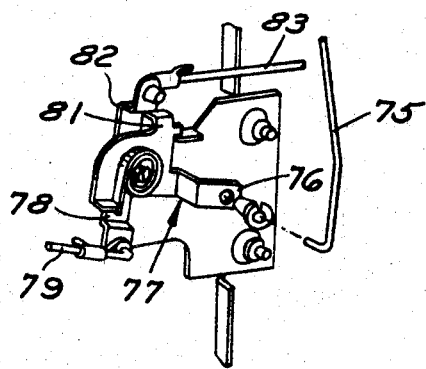
FIG. 7 is an illustration of the lever system for transmitting motion of the inside operator for releasing the door-tailgate for use as a tailgate swingable about its horizontal hinge axis.

Referring now to FIGS. 4 and 7, there are shown the devices through which the door-tailgate is held to the vehicle body in closed position or is actuated for operation as a door or a tailgate. As can be seen from FIG. 4, upper and lower latch mechanism striker devices, designated 38 and 39, respectively, are secured to the body frame member 41 framing the right edge of the access opening 11. Each striker device 38, 39 comprises a mounting plate 43 and a headed pin 42 projecting into the opening.

Mounted on the door-tailgate end panel 44 are an upper latch device 45 and a lower latch device 46. The upper latch device comprises a single hook-like member or jaw element 47 adapted in close position of the door-tailgate to hook over the pin 42 of the striker device 38. The lower latch device comprises a pair of opposed hook-like members or jaw elements 48 adapted to encompass the headed pin 42 of the lower striker device 39.

The headed pin 42 of the lower striker device 39 is in alignment with the horizontal pintle 23 of the multi-hinge mechanism 15 at the opposite end of the door-tailgate. When the jaws of the lower latch mechanism are in encompassing engagement with the lower headed pin 42, the door-tailgate can be swung about the horizontal pivot axis defined by the lower headed pin 42 functioning as a pintle and the pintle 23 and there will be no interference with the latching function of the lower latch mechanism. The lower latch device 46 is actually part of a combination hinge-latch mechanism, generally designated 49, as will be more fully explained.

The upper latch device 45 is a part of a latch mechanism, generally designated 51. This latch mechanism 51, in addition to providing for latching engagement of jaw element 47 with striker device 38, has many other functions to perform insofar as its internal mechanism is concerned in controlling the operation of the door-tailgate as a door or as a tailgate. Reference is made to FIG. 6 for an illustration of the internal mechanism comprising the upper latch mechanism 51. (This latch mechanism 51 is described in complete detail in copending application Ser. No. 580,402, filed Sept. 19, 1966, in the names of Edward H. Koch and William L. Schlichter and assigned to the assignee of this application.)

The single jaw element 47 of the upper latch mechanism 51 is mounted on a pivot pin 52 which is coupled to a control plate concealed beneath a spiral or clock-type spring 53. This spring, when the upper jaw element 47 is moved to latching engagement with the upper striker device headed pin 42, becomes wound up and upon release of the latch mechanism a slight outward kick is provided to the jaw element to cause the door to move away from the body. The ratchet plate is held in latched position by a detent portion (not visible) of a lever 54 having a substantially horizontal arm 55 and an upwardly extending arm 56. The detent lever 54 is urged into ratchet plate engaging direction by its own spiral wound spring 57. The horizontally extending arm of the lever 56 overlies an arm 58 of a pivoted operating lever 59 which is pivotally mounted by a pivot stud 61 on the support plate 62 of the upper latch mechanism.

The upper and lower mechanisms are interlinked by a pair of rod devices. The first rod device 63 extends from a lever 64 having an arm 65 underlying the arm 56 of the detent lever 54. The lever 64 is engageable at its end 66 by the outside operating handle mechanism 67. This operation of the outside handle mechanism 67 is transmitted through the rod device 63 to the lower latch mechanism 49 so that both latch mechanisms simultaneously will be released and the door-tailgate will function as a door swingable about the vertical hinge axis defined by the pintle 21 and the rectangular headed pintle 37 on the upper hinge mechanism 33 above the multi-hinge mechanism 15.

The second rod device 68 has the function of providing an interlock between the upper and lower latch mechanisms so that the latch mechanisms cannot be disengaged from their striker devices unless the tailgate window is a completely down position. This feature is necessary in order to prevent damage to the window when the door-tailgate is used as a tailgate, although it is not an absolute necessity when the door-tailgate is swung open as a door. As a practicle matter, however, when the window is raised it is engaged in channels 69 on the vehicle body framing members defining the rear access opening 11. Therefore, any attempt to swing the door-tailgate in door opening direction would be futile because there is no way to disengage the window edges from the guide channels except by lowering the window. Thus, it is only only when the window is in a fully retracted position that it is desirable that the latch mechanisms be actuatable so the door-tailgate can be swung as a door or as a tailgate. It will be noted that the rod device 68 has a right angle extension 71 at its lower end which is adapted to be engaged by the window frame when the latter is lowered to a fully down position. The rod device at its upper end 72 is coupled to a lever 73 which prevents actuation of the upper latch mechanism unless the locking lever 73 has been moved to a noninterfering position as a result of the rod device being moved downwardly when engaged by the window. The locking lever 73 has a hook-like portion (not visible) which hooks over the arm 55 of the detent lever 53 to prevent movement of the latter. Unless the blocking lever is moved to a neutral position, the door-tailgate cannot be opened either in tailgate manner or normal door manner.

The door-tailgate is opened for tailgate purposes from the inside of the vehicle. Referring to FIGS. 5 and 7, it will be noted there is mounted on the inner panel of the door-tailgate a lock release handle, generally designated 74, comprising a pivoted member which faces inwardly of the vehicle, when the door is in a closed position, and which is coupled to a link 75. The link 75 in turn is coupled to an arm 76 of a bell crank lever 77 having a downwardly depending arm 78 which is coupled by a rod 79 to the upper combination hinge-latch mechanism 33. The bell crank lever 77 is provided with an upwardly extending arm 81 having a tab or abutment portion adapted upon swinging of the bell crank lever in a counterclockwise direction as viewed in FIG. 7 to abut pivoted member 82. Pivoted member 82 is coupled by a link 83 which is attached to the bell crank lever 59 of the upper latch mechanism.

Other features are provided such as a torsion bar 84 which extends across the bottom of the tailgate, FIG. 5. At its left end, the FIG. 2 end, the torsion bar 84 is provided with a substantially vertically extending arm 85 which is interlocked with a horizontally extending link 86 held by a bracket 87 mounted on the body member 19 framing access opening 11. At the other end, the torsion bar terminates in an arm 88 having abutting relationship to a bracket 89 within the door panel. The torsion bar pivots vertically when the door-tailgate is opened as a door. When the door-tailgate is moved from an upstanding position to a horizontal tailgate position, however, the torsion bar is twisted so that it will provide a substantial assist force when it is desired to lift the tailgate back to its upstanding closed position.

A summarization of the strucural features and the safety and convenience features of the door-tailgate embodying the present invention, may be helpful in clarifying the manner in which the door-tailgate is operated. To open the tailgate to a horizontal position from a vertical upstanding closed position, it first is necessary to roll the door-tailgate window to a full down position and then to lift up on the inside handle 74. By rolling the window to the full down position, the rod device 68 is shifted to move locking lever 73 to a neutral position. With locking lever 73 in a neutral position, movement of handle 74 is transmitted through link 83 to lever 59 causing the arm 58 of the latter to engage detent lever 54 to release the upper latch device 45. The spring loaded latch device will tend to move to a position of disengagement with the striker device 38 mounted at the upper right-hand corner of the body framing member 41. Lifting of the inside handle 74 simultaneously causes transmittal through the upper hinge release link 79 of movement to the spring loaded latch of the upper hinge-latch mechanism 33 so that the rectangular end portion is not gripped against moving out of the slot on the "hinge on gate" part 35. The tailgate is then swingable on the multi-hinge horizontal pintle 23 and the lower hinge-lock mechanism striker pin 42, the latter thus functioning as a pintle.

If it is desired to open the door-tailgate as a door, again the window first must be rolled to a fully down position. This time, however, the outside door handle 67 is turned in a clockwise direction to actuate the upper latch mechanism 51 and also the lower hinge-latch mechanism 49 through the connecting rod device 63 to release the detents holding the latch devices in engagement with the upper and lower striker devices. This will allow the door-tailgate to pivot on the upper hinge pin and the lower multi-hinge mechanism vertical pivot pin.

As briefly noted above, the lower hinge-latch mechanism, generally designated 49, has a pair of jaw elements 48 adapted to encompass the striker pin 42 for latching engagement and also for swivelling therearound. The latch mechanism 49 is provided with any suitable mechanism for holding the jaw elements 48 in latched position. In FIG. 6 there may be seen portions of inter-meshed ratchet plates 91 coupled to the pivot shafts, such as 92 journalling the jaw elements 48 on latch mechanism case plate 93. A spiral spring 94 is coupled to one of the pivot shafts for spring loading the jaw elements in unlatching direction. A detent lever 95 is releasably engageable with one of the ratchet plates to hold the jaw elements in latched condition. It is this lever 95 that is coupled to link or rod 63 so that when the latter is raised by actuation of lever 64 of the upper latch mechanism, the lever 95 will be disengaged simultaneously from the ratchet plate with which it is engaged.

Neither the inside nor the outside handle can be actuated unless the window is in a full down position. As was explained, the rod device 68 must be shifted downwardly to move the blocking lever 73 out of engagement with the arm 55 of detent lever 53 so the latter can be disengaged from the ratchet plate coupled to the upper jaw element 47.

The inside handle will not actuate when the tailgate is open or being opened as a door because the bell crank 59 is blocked from movement by a blocking portion 96 on the end of its arm 58. This blocking portion is obstructed by arm 55 of the detent lever 53 which raises from its FIG. 6 position when actuated by the outside handle through lever 64. With bell crank lever 59 blocked, the link 83 back to the remote control mechanism lever 82 is blocked and the lever 77 is in turn immobilized. With lever 77 immobilized no movement can be imparted to rod 79 leading to hinge-latch mechanism 33.

The outside handle will not actuate when the tailgate is opened or being opened as a drop gate. The lever 59 carries a blocking rod 97 which, when lever 59 is swung counterclockwise as seen in FIG. 6 by actuation of inside handle 74, overlies a part of outside handle 67 operates lever 64 to block swinging movement of the latter. With lever 64 blocked against swinging movement, the outside handle is rendered inoperative to release latch mechanisms 51 and 49.

It will be understood that the invention is not to be limited to the exact construction shown and described, but that various changes and modifications may be made without departing from the spirit and scope of the invention as defined in the appended claims.

We claim:

1. In a vehicle body of the station wagon type having a passenger-cargo carrying area,
body members framing a substantially upright access opening to said passenger-cargo carrying area,
a dual action door for said opening,
said dual action door when closing said access opening being in a substantially upright position and coupled to said body members by attachment means at four points of attachment,
at one side of the door the attachment means at the bottom comprising a multi-hinge mechanism and at the top a first combination hinge-latch mechanism,
at the other side of the door the attachment means comprising at the bottom a second combination hinge-latch mechanism and at the top a latch mechanism,
and operating means on said door coupled to the combination hinge-latch mechanisms and to the latch mechanism,
said operating means being operable selectively to release simultaneously the latch mechanism of said first combination hinge-latch mechanism and said latch mechanism without impairing the hinge function of said second combination hinge-latch mechanism whereby said door is downwardly swingable as a tailgate about a hinge axis formed by the double hinge mechanism and said second combination hinge-latch mechanism,
or said operating means being selectively operable to release the latch mechanism of said second combination hinge-latch mechanism and the latch mechanism located at said other side of the door without impairing the hinge function of the first combination hinge-latch mechanism whereby said door is vertically swingable about a hinge axis formed by the double hinge mechanism and the first combination hinge-latch mechanism.

2. In a vehicle body according to claim 1 in which:
the operating means on said door comprises inner operable means and outer operable means,
said inner operable means being coupled to the latch mechanism of said first combination hinge-latch mechanism and to said latch mechanism,
and said outer operable means being coupled to the latch mechanism of said second combination hinge-latch mechanism and to said latch mechanism.

3. In a vehicle body according to claim 2 in which:
interlock means are coupled to said inner and outer operable means so that operation of one of said means negates operation of the other of said means.

4. In a vehicle body according to claim 1 in which:
the multi-hinge mechanism is fastened to the body frame member and to the door;
the first combination hinge-latch mechanism comprises a latch means mounted on said door and a pintle carried on said body frame member, said pintle also functioning as the striker for respective latch means;
the second combination hinge-latch mechanism comprises a latch means mounted on said door and a pintle carried on said body frame acting also as a striker for the respective latch means;
and the latch mechanism comprises latch means on said door and a striker pin carried on said body frame member.

5. In a vehicle body according to claim 4 in which:
the operating means on said door comprises inner operable means and outer operable means,
said inner operable means being coupled to the latch mechanism of said first combination hinge-latch mechanism and to said latch mechanism,
and outer operable means being coupled to the latch mechanism of said second combination hinge-latch mechanism and to said latch mechanism.

6. In a vehicle body according to claim 5 in which:
interlock means are coupled to said inner and outer operable means so that operation of one of said means negates operation of the other of said means.

7. In a vehicle body according to claim 1 in which,
the multi-hinge mechanism has a vertically extending pintle and a horizontally extending pintle;
the first combination hinge-latch mechanism comprises a vertical pintle fastened to a body frame member and in alignment with the vertical pintle of said multi-hinge member,
and a latch means carried by said door,
said latch means gripping said vertical pintle for rotation therearound or latching disengagement therefrom;
the second combination hinge-latch mechanism comprises a horizontal pintle fastened to a body frame member and in alignment with the horizontal pintle of said multi-hinge member,
and a latch means carried by said door,
said latch means gripping said horizontal pintle for rotation therearound or latching disengagement therefrom; and
the latch mechanism comprises latch means on said door and a striker pin carried on a body frame member,
said striker pin being substantially parallel to said horizontal pintles.

8. In a vehicle body according to claim 7 in which:
the operating means on said door comprises inner operable means and outer operable means,
said inner operable means being coupled to the latch mechanism of said first combination hinge-latch mechanism and to said latch mechanism.
and outer operable means being coupled to the latch mechanism of said second combination hinge-latch mechanism and to said latch mechanism.

9. In a vehicle body according to claim 8 in which:
interlock means are coupled to said inner and outer manually operable means so that operation of one of said means negates operation of the other of said means.

10. In a vehicle body according to claim 9 in which:
a torsion bar is coupled to said body frame and door to counterbalance a substantial portion of the weight of said door when swung downwardly as a tailgate.

References Cited

UNITED STATES PATENTS

| | | | |
|---|---|---|---|
| 2,195,991 | 4/1940 | Lovett | 49—193 X |
| 3,018,508 | 1/1962 | Keeling | 16—147 |
| 3,030,656 | 4/1962 | Hopkins | 16—147 |
| 3,105,266 | 10/1963 | Flaith et al. | 16—147 |

DAVID J. WILLIAMOWSKY, *Primary Examiner.*

DENNIS L. TAYLOR, *Examiner.*